United States Patent
Park et al.

(10) Patent No.: US 9,145,134 B2
(45) Date of Patent: Sep. 29, 2015

(54) METHOD AND SYSTEM FOR CONTROLLING ENGINE START OF HYBRID VEHICLE

(71) Applicants: Hyundai Motor Company, Seoul (KR); Kia Motors Corporation, Seoul (KR)

(72) Inventors: Tae Wook Park, Incheon (KR); Yong Kak Choi, Seoul (KR); Il Kwon Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 148 days.

(21) Appl. No.: 13/717,408

(22) Filed: Dec. 17, 2012

(65) Prior Publication Data

US 2014/0100730 A1  Apr. 10, 2014

(30) Foreign Application Priority Data

Oct. 5, 2012  (KR) .................. 10-2012-0110933

(51) Int. Cl.
   *B60W 10/06*   (2006.01)
   *B60W 20/00*   (2006.01)

(52) U.S. Cl.
   CPC ............... *B60W 20/20* (2013.01); *B60W 10/06* (2013.01); *B60W 20/40* (2013.01); *B60W 2540/106* (2013.01); *Y02T 10/48* (2013.01); *Y10S 903/903* (2013.01)

(58) Field of Classification Search
   CPC . B60W 20/102; B60W 20/106; B60W 20/40; B60W 20/00; Y10S 903/903
   USPC .......................................................... 701/22
   See application file for complete search history.

(56) References Cited

U.S. PATENT DOCUMENTS

| | | | | |
|---|---|---|---|---|
| 6,058,349 A | * | 5/2000 | Kikori et al. | 701/114 |
| 6,073,074 A | * | 6/2000 | Saito et al. | 701/110 |
| 2003/0052650 A1 | * | 3/2003 | Gunji | 320/155 |
| 2004/0232883 A1 | * | 11/2004 | Ochiai et al. | 320/125 |
| 2006/0232232 A1 | * | 10/2006 | Kamiya | 318/139 |
| 2007/0080005 A1 | * | 4/2007 | Joe | 180/65.2 |
| 2009/0125173 A1 | * | 5/2009 | Komatsu et al. | 701/22 |
| 2010/0052588 A1 | * | 3/2010 | Okamura et al. | 318/434 |
| 2010/0275047 A1 | * | 10/2010 | Kaneko et al. | 713/323 |

FOREIGN PATENT DOCUMENTS

| | | |
|---|---|---|
| JP | 2002142304 A | 5/2002 |
| JP | 2009107502 A | 5/2009 |
| JP | 2009234565 A | 10/2009 |

* cited by examiner

*Primary Examiner* — Calvin Cheung
*Assistant Examiner* — Martin Weeks
(74) *Attorney, Agent, or Firm* — Mintz Levin Cohn Ferris Glovsky and Popeo, P.C.; Peter F. Corless (57) ABSTRACT

Provided is a method and a system for controlling engine start of a hybrid vehicle based on acceleration demanded power of a driver. More specifically, a variance of an output signal of an accelerator pedal sensor (APS) senses manipulation of an accelerator pedal reflecting an acceleration demand of a driver. When the variance of the output signal of the accelerator pedal sensor is a positive threshold value, acceleration demanded power corresponding to the output signal of the accelerator pedal sensor is calculated in a section in which the variance is positive and the calculated acceleration demanded power is accumulated. The accumulated acceleration demanded power is then compared with a set power value, and the engine is started to switch from the EV mode to the HEV mode when the accumulated acceleration demanded power is equal to or greater than the set power value.

8 Claims, 6 Drawing Sheets

FIG. 1

PRIOR ART

FIG. 2

PRIOR ART

METHOD AND SYSTEM FOR CONTROLLING ENGINE START OF HYBRID VEHICLE

CROSS-REFERENCE TO RELATED APPLICATION

This application claims priority to and the benefit of Korean Patent Application No. 10-2012-0110933 filed in the Korean Intellectual Property Office on Oct. 5, 2012, the entire contents of which are incorporated herein by reference.

BACKGROUND OF THE INVENTION (a) Field of the Invention

The present invention relates to a method and a system for controlling engine start of a hybrid vehicle configured to control engine start in a hybrid vehicle based on acceleration demanded power from a driver.

(b) Description of the Related Art

As oil prices increase and exhaust gas regulations tighten, eco-friendly demands and fuel efficiency improvements have become the focus of many automotive manufactures. Accordingly, vehicle manufactures have put forth increased efforts to develop technologies for reducing fuel consumption and decreasing exhaust gas emissions in order to meet eco-friendly demands and improve fuel efficiency.

In response to the above demands, the automotive manufactures have particularly focused interests and efforts toward development hybrid electric vehicles (HEV) which utilize a combination of power from an engine and power from a motor to achieve high degrees of fuel efficiency. As a result, hybrid vehicles have met purchase demands of many customers due to their high fuel efficiency and eco-friendly image.

Figure 1:
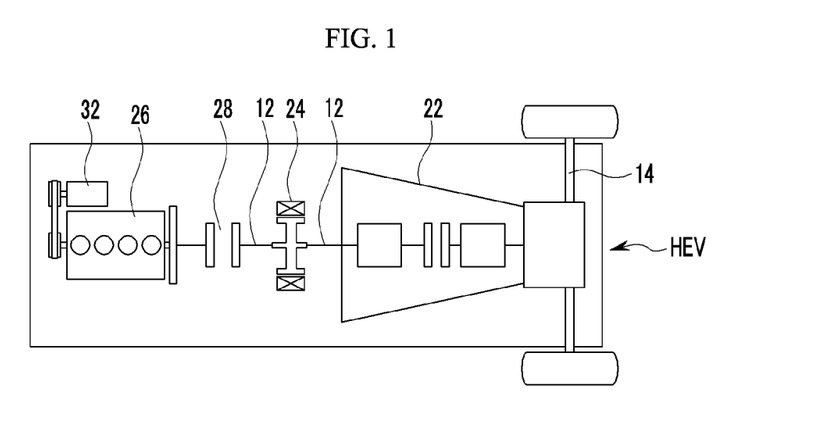
FIG. 1 is a concept view of a conventional hybrid vehicle.

FIG. 1, in particular, illustrates a conceptual configuration of a hybrid vehicle. Referring to FIG. 1, a hybrid vehicle (HEV) typically includes a transmission 22 for adjusting and determining a speed ratio between a driving shaft 12 and a wheel shaft 14. An electric motor 24 configured to transfer power to the driving shaft 12 via electric energy and regenerate energy via inertia from the vehicle during braking. An engine 26 generates power via fuel injection into one or more cylinders of the engine, and an engine-side clutch 28 transfers power from the engine 26 to the driving shaft 12 and cuts off the power of the engine 26 accordingly. Lastly, an engine starting/stopping motor 32 is configured to start and stop the engine 26. The engine starting/stopping motor 32 may be called an idle stop & go (ISG) or a hybrid starter & generator (HSG), as referred in a vehicle industry and thus for purposes discussed herein are thought of as one and the same.

As mentioned above, hybrid vehicles may run by appropriately via a combination of power from the engine 26 and from the electric motor 24. That is, the hybrid vehicle may run via the power from the engine 26 on a road, such as an expressway, in which a high speed is allowed, and via power from the electric motor 24 on a road in which traffic is congested or at lower speeds such as in the city.

As a result, hybrid vehicles run in an electric vehicle (EV) mode using only an electric motor when driving requires little torque or power, and run in a hybrid electric vehicle (HEV) mode using the electric motor and the engine together when driving requires a larger torque or power.

Hybrid vehicles run while appropriately switching between the EV mode and the HEV mode depending on a driving situation according to a characteristic thereof. For example, conditions under which the EV mode is switched to the HEV mode may include: (1) a driving demanded power (or acceleration demanded power) of a driver exceeds a discharge allowance maximum value of a battery; (2) a driving demanded power of a driver exceeds maximum power generable by the motor; (3) a driving demanded power of a driver exceeds a preset high-output driving demanded power value; and/or (4) a driving demanded power of a driver exceeds a preset low output driving demanded power for a predetermined time or longer.

It will be apparent to those skilled in the art that the driving demanded power of the driver under conditions (1) to (3) is considerably smaller than the driving demanded power of driver under condition (4). More specifically, the driving demanded power of the driver may be variously sensed. For example, the driving demanded power of the driver may be sensed through an output value variance (or variation ratio) of an accelerator pedal sensor (APS) according to manipulation of an accelerator pedal by the driver.

Conditions (1) to (3) are generally understood by those skilled in the art. However, condition (4) may be a selective mode switching condition. A reason for setting the mode switching condition, such as condition (4), may be as follows. That is, the driving condition is sufficient for operating within the EV mode, however it is necessary to more rapidly switch from the EV mode to the HEV mode by slightly decreasing an EV mode operating time (section) for a future battery SOC management control algorithm (charge/discharge management). Otherwise, the reason of setting the mode switching condition is that when a predetermined time (for example, 2.5 seconds, FIG. 2) passes after a driver of the hybrid vehicle steps on an accelerator pedal (or a driving demanded power of a driver starts to exceed a preset low-output driving demanded power), it is necessary to achieve an effective SOC management by charging the battery with an extra portion of the power from the engine by entering the HEV mode.

However, when condition (4) is applied to the hybrid vehicle as the mode switching condition, the EV mode may frequently switch to the HEV mode, thereby incurring repetitive switching. The reason is that the engine needs to be started while switching from the EV mode to the HEV mode as described above.

An exemplary situation in which a frequent mode switching may occur under mode switching condition (4) will be described below. For example, an accelerator pedal manipulation characteristic of a particular driver while operating the vehicle and analyzed through an operational characteristic of an accelerator pedal sensor (APS) may exhibit the characteristic illustrated in FIG. 2.

Figure 2:
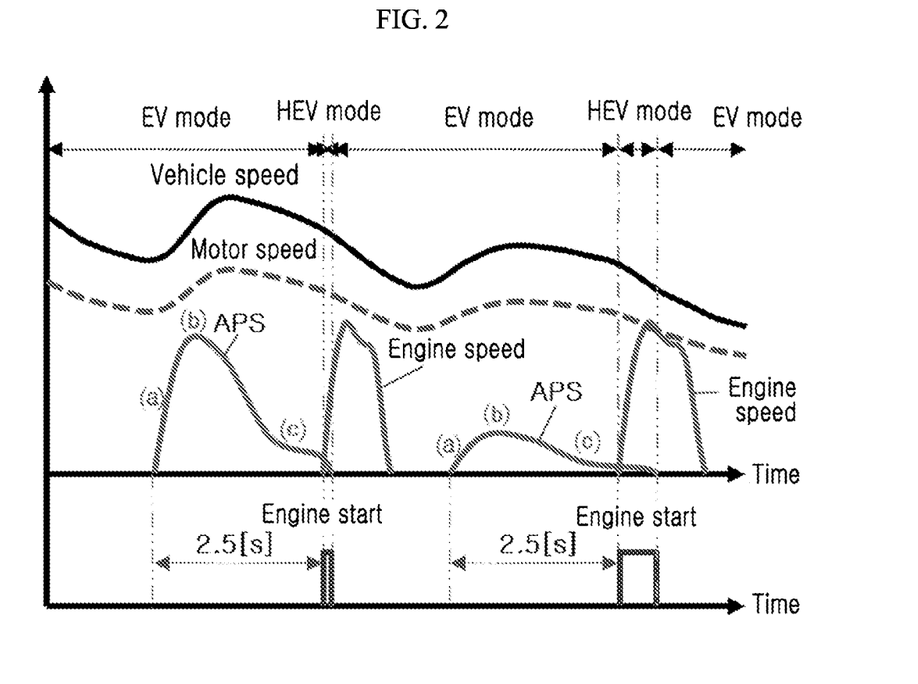
FIG. 2 is an example diagram for describing a problem in the conventional art.

Referring to FIG. 2, section (a) of the APS is a section in which a driver steps on the accelerator pedal to thereby request acceleration so that an output value of the APS increases, section (b) of the APS is a section in which a driver uniformly steps on the accelerator pedal for acceleration at a fixed speed so that an output value of the APS is uniformly maintained, and section (c) of the APS is a section in which a driver releases the accelerator pedal for decelerated driving so that an output value of the APS decreases.

However, conventionally, since the output value of the APS decreases in section (c) of the APS due to the reason below, once the predetermined period of time (for example, 2.5 seconds, FIG. 2) passes after the driver initially steps on the accelerator pedal (that is, the driving demanded power of the driver starts to exceed the preset low-output driving demanded power), the vehicle switches to the HEV mode even though the driving mode needs to be in the EV mode, thereby negatively influencing fuel efficiency and the state of charge (SOC) management of the hybrid vehicle.

As described above, because of mode switching in condition (4), the engine is started and the vehicles switches to an HEV mode even though the driving mode should be in an EV mode because the output value of the APS decreases in section (c) of the APS in FIG. 2.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a method and a system for controlling engine start of a hybrid vehicle which is able to achieve improved fuel efficiency and SOC management by calculating and accumulating acceleration demanded power (output) when variance of a accelerator pedal sensor is a positive threshold value, that is, a positive variance value of the accelerator pedal sensor for each set time by manipulation of a driver, and controlling start of an engine to and switching to the HEV mode when the amount of accumulated acceleration demanded power is equal to or greater than a set value.

An exemplary embodiment of the present invention provides a method of controlling start of an engine in a hybrid vehicle running in an electric vehicle (EV) mode using only power from an electric motor or in a hybrid electric vehicle (HEV) mode using the power from both the electric motor and the engine together. In particular, variance of an output signal of an accelerator pedal sensor (APS) configured to sense manipulation of an accelerator pedal reflecting an acceleration demand of a driver is calculated by a controller. When the variance of the output signal of the accelerator pedal sensor is a positive threshold value that is positively increased for each set time, calculating, by the controller, acceleration demanded power corresponding to the output signal of the accelerator pedal sensor in a section in which the variance is positive and accumulating, by the controller, the calculated acceleration demanded power; and comparing the accumulated acceleration demanded power with a set power value. As a result, the controller starts the engine and switches from the EV mode to the HEV mode when the accumulated acceleration demanded power is equal to or greater than the set power value.

In the exemplary embodiment of the present invention, the set power value may be set to be less than a power value corresponding to a discharge allowance maximum value of a battery configured to supply power to the electric motor. The set power value may be set to be less than a maximum output value of the electric motor.

In the exemplary embodiment of the present invention, the acceleration demanded power may be calculated through torque and a speed of the vehicle according to mapping of the accelerator pedal sensor, and the accumulated acceleration demanded power may be reset after the starting of the engine.

Another exemplary embodiment of the present invention provides a system for controlling start of an engine in a hybrid vehicle running in an electric vehicle (EV) mode using only power from an electric motor or in a hybrid electric vehicle (HEV) mode using power from both the electric motor and the engine together. In particular, an acceleration demand detector is configured to detect an acceleration demand from a driver, and an engine starting motor is configured to start the engine when the EV mode is switched to the HEV mode. A control unit (e.g., one or more controllers) is configured to start the engine by controlling the engine starting motor based upon a signal from the acceleration demand detector. The control unit may be made up of in which the control unit is one or more controllers including one or more processors operated by a series of program instructions. These program instructions are a series of commands that are configured to start the engine of a hybrid vehicle upon switching to an HEV mode.

In the exemplary embodiment of the present invention, the control unit may include: a battery management system (BMS) configured to manage a battery of the hybrid vehicle; an engine control unit (ECU) configured to control the engine; a motor control unit (MCU) configured to control the electric motor; and a hybrid control unit (HCU) making a control by combining power of the engine and power of the electric motor. These control units may be part of a single controller or each individual controller configured to execute the program instructions described herein.

In the exemplary embodiment of the present invention, the hybrid control unit may include: an accelerator pedal sensor signal receiving unit configured to receive the output signal of the accelerator pedal sensor; a variance calculation and determination unit configured to calculate variance of a value received from the accelerator pedal sensor signal receiving unit and determine whether a value of the calculated variance is a positive value; an acceleration demanded power calculation and accumulation unit configured to calculate acceleration demanded power corresponding to the output signal of the accelerator pedal sensor in a section in which the value of the variance is the positive value when the value of the variance is positive, and accumulate the calculated acceleration demanded power; and an engine start control signal output unit configured to determine whether the accumulated acceleration demanded power is equal to or greater than a set power value, and output a control signal for starting the engine when the accumulated acceleration demanded power is equal to or greater than the set power value.

In the exemplary embodiment of the present invention, the system may further include an acceleration demanded power reset unit configured to reset the accumulated acceleration demanded power when the signal for starting the engine is output.

As described above, according to the exemplary embodiments of the present invention, acceleration demanded power (output) is calculated and accumulated when variance of the accelerator pedal sensor is a positive threshold value, and the starting of the engine is controlled to switch to the HEV mode when the accumulated acceleration demanded power is equal to or greater than a set value, thereby efficiently achieving high fuel efficiency and SCO management.

According to the exemplary embodiments of the present invention, it is possible to limit unnecessary starting of the engine, thereby reducing fuel consumption, improving noise vibration harshness (NVH) performance. Additionally, it is possible to limit the unnecessary operation of the engine stopping/starting motor, thereby decreasing unnecessary waste of power. Furthermore, it is possible to limit unnecessary starting of the engine and the entry into the HEV mode, thereby preventing shock and jerk generated due to the engine clutch engaging and disengaging. Finally, it is also possible to expand how often the vehicle is operating in a low-speed EV mode driving section, thereby improving a merchantable quality of a hybrid vehicle and improving durability of relevant components.

BRIEF DESCRIPTION OF THE DRAWINGS

The above and other features of the present invention will now be described in detail with reference to an exemplary embodiment thereof illustrated the accompanying drawings which are given hereinbelow by way of illustration only, and thus are not limitative of the present invention, and wherein.

DETAILED DESCRIPTION

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Furthermore, the control logic of the present invention may be embodied as non-transitory computer readable media on a computer readable medium containing executable program instructions executed by a processor, controller or the like e.g., within the MCU 14 and the IPS device 12. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Although the below exemplary embodiment is described as using a single controller/processor to perform the above process, it is understood that the above processes may also be performed by a plurality of controllers/processors.

Hereinafter, exemplary embodiments of the present invention will be described in detail with reference to the accompanying drawings.

FIG. 1 is a diagram schematically illustrating a hybrid vehicle to which an engine start control system of a hybrid vehicle according to an exemplary embodiment of the present invention is applied. As illustrated in FIG. 1, a hybrid vehicle to which an engine start control system of a hybrid vehicle according to an exemplary embodiment of the present invention is applied includes a transmission 22 for adjusting and determining a speed ratio between a driving shaft 12 and a wheel shaft 14, an electric motor 24 configured to transfer power to the driving shaft 12 via electric energy and regenerating energy via inertia from the vehicle during braking, an engine 26 configured to generate power via fuel injection, an engine-side clutch 28 configured to transfer the power from the engine 26 to the driving shaft 12 and cutting off the power from the engine 26 accordingly, and an engine starting/stopping motor 32 configured to start and stop the engine 26.

The fact that the electric motor 24 and the engine starting/stopping motor 32 are operated as generators to charge a battery in the hybrid vehicle according to a necessity is well understood by those skilled in the art, as such a detailed description thereof will be omitted in the present specification for brevity.

Figure 3:
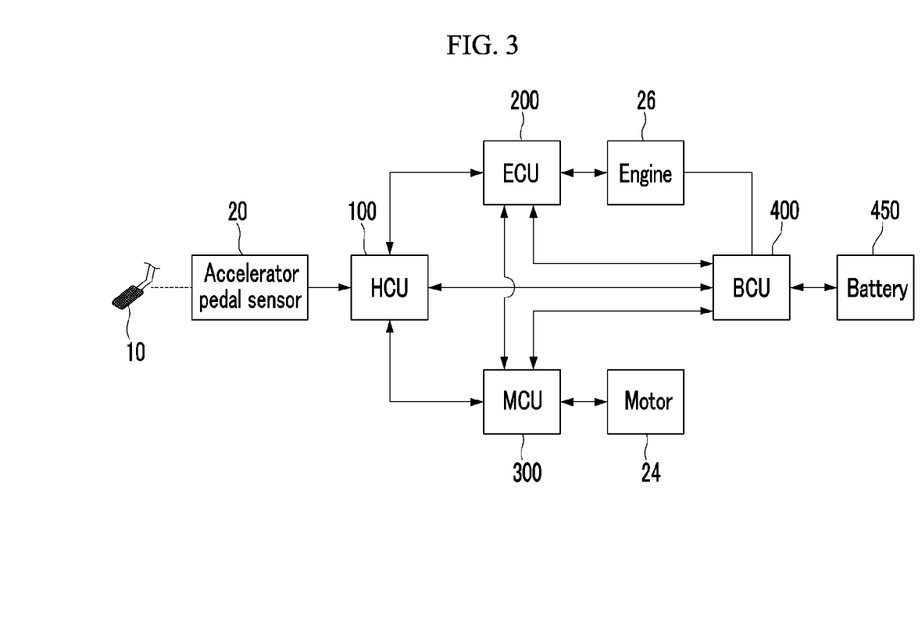
FIG. 3 is a configuration diagram of an engine start control system of a hybrid vehicle according to an exemplary embodiment of the present invention.
Figure 4:
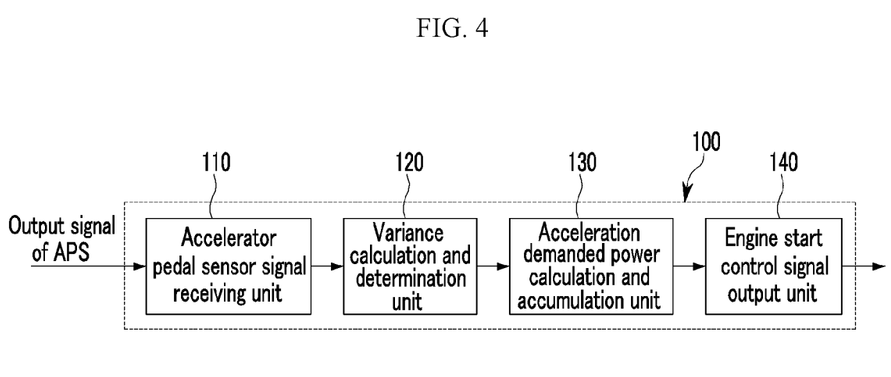
FIG. 4 is a detailed block diagram of a hybrid control unit according to an exemplary embodiment of the present invention.

FIGS. 3 and 4 are configuration diagrams illustrating the engine start control system of the hybrid vehicle according to an exemplary embodiment of the present invention. The engine start control system of the hybrid vehicle according to the exemplary embodiment of the present invention is an engine start control system for controlling start of the engine 26 in a hybrid vehicle which runs in an electric vehicle (EV) mode using only power from the electric motor 24 or in a hybrid electric vehicle (HEV) mode using power from the electric motor 24 and the engine 26 together.

The engine start control system according to the exemplary embodiment of the present invention includes an acceleration demand detector configured to detect an acceleration demand from a driver, an engine starting/stopping motor 32 serving as an engine starting motor for starting the engine during switching from the EV mode to the HEV mode, and a control unit configured to control the engine starting motor based on a signal of the acceleration demand detector to start the engine.

In the exemplary embodiment of the present invention, the acceleration demand detector may be embodied as an accelerator pedal sensor (APS) 20 configured to sense manipulation of the accelerator pedal 10 (e.g., an opening rate of the accelerator pedal) and changing an output value in connection with the opening rate of the accelerator pedal 10, but it should be understood that the scope of the present invention is not essentially limited thereto. Even though a configuration is different from the accelerator pedal sensor, the technical spirit of the present invention may be applied to the configuration when the configuration is capable of detecting a value corresponding to the actual acceleration demand of the driver.

The control unit may be one or more controllers which each include one or more processors operated by a series of program instructions. These program instructions may includes a series of commands for performing an engine start control method of a hybrid vehicle according to an exemplary embodiment of the present invention to be described later.

In the exemplary embodiment of the present invention, as illustrated in FIGS. 3 and 4, the control unit may include battery management system (BMS) 400 configured to manage a battery 450 for supplying driving power of the hybrid vehicle, an engine control unit (ECU) 200 configured to control an operation of the engine 26, a motor control unit (MCU)

300 configured to control an operation of the electric motor 24 and/or the engine starting/stopping motor 32; and a hybrid control unit (HCU) 100 configured to control all of the operations of the hybrid vehicle and more specifically control when the vehicle switches to the HEV mode thereby combining the power from the engine 26 and the power from the motor 24.

A partial process of the engine start control method of the hybrid vehicle according to the exemplary embodiment of the present invention to be described later may be performed by the HCU 100, another partial process may be performed by the MCU 300, and yet another partial process may performed by the ECU 200. However, it should be understood that the scope of the present invention is not limited to the exemplary embodiment to be described later. The control unit may be implemented with a configuration different from that described in the exemplary embodiment of the present invention. Otherwise, the HCU 100, the ECU 200, and the MCU 300 may perform a combination of processes different from those described in the exemplary embodiment. Also, each of the MCU 300, ECU 200 and HCU 100 may be embodied as separate controllers each having their own processor and memory respectively.

In the exemplary embodiment of the present invention, the existing accelerator pedal, accelerator pedal sensor, BMS, ECU, and MCU may be directly used as the accelerator pedal 10, the accelerator pedal sensor 20, the BMS 400, the ECU 200, and the MCU 300, so that detailed description thereof will be omitted. The HCU 100 may execute a command for performing the engine start control method of the hybrid vehicle according to the exemplary embodiment of the present invention illustrated in FIG. 5.

To this end, as illustrated in FIG. 4, the HCU 100 may include an accelerator pedal sensor signal receiving unit 110 configured to receive an output signal from the APS 20, a variance calculation and determination unit 120 configured to calculate variance of a value received in the accelerator pedal sensor signal receiving unit 110 and determining whether a value of the calculated variance is a positive value, an acceleration demanded power calculation and accumulation unit 130 configured to, when the value of the variance calculated in the variance calculation and determination unit 120 is the positive value, calculate acceleration demanded power corresponding to the output signal of the APS 20 in a section in which the value of the variance is the positive value and accumulate the calculated acceleration demand power, and an engine start signal output unit 140 configured to determine whether the accumulated acceleration demand power is equal to or greater than a set power value and output a signal that starts the engine when the accumulated acceleration demand power is equal to or greater than the set power value.

Figure 5:
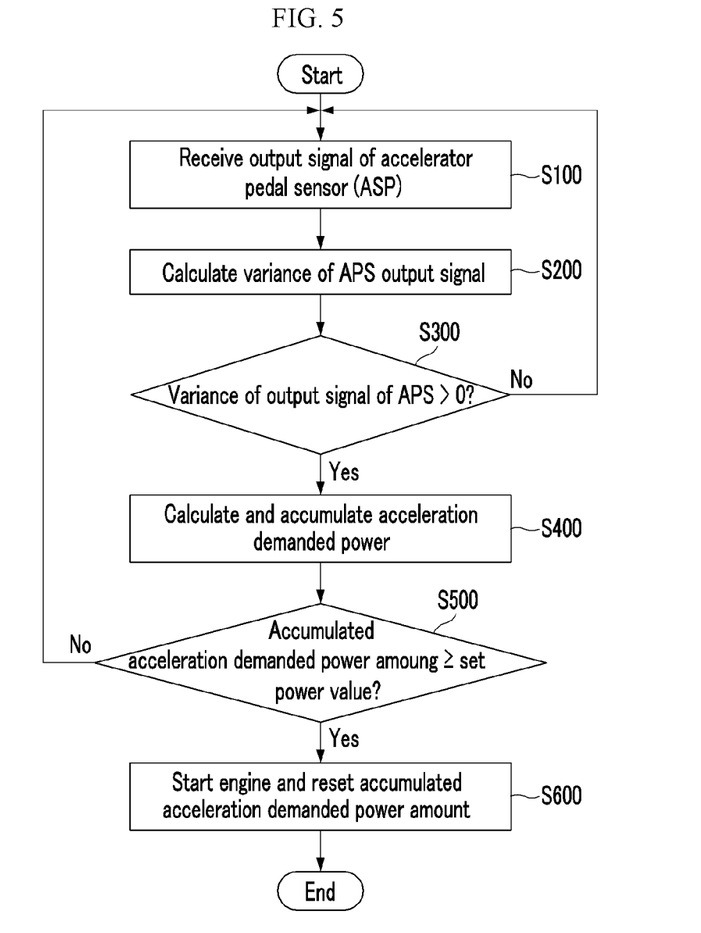
FIG. 5 is a flowchart of an engine start control method of a hybrid vehicle according to an exemplary embodiment of the present invention.

A method implemented by the engine start control system of the hybrid vehicle according to the exemplary embodiment of the present invention will be described below. Referring to FIG. 5, the engine start control method of the hybrid vehicle according to the exemplary embodiment of the present invention includes receiving an output signal from the APS 20 by sensing manipulation of the accelerator pedal 10 (or an opening rate of the accelerator pedal) at a controller (e.g., the HCU 100) (S100) and calculating, by the controller, variance of the output signal (S200), when the calculated variance of the output signal of the APS 20 is a positive threshold value that positively increases for each set period of time (S300). An acceleration demand power corresponding to the output signal of the APS 20 is calculated in a section in which the variance is positive and the calculated acceleration demand power is accumulated (S400). The accumulated acceleration demand power is then compared with a set power value (S500) and a value of the accumulated acceleration demand power by starting the engine is reset when the accumulated acceleration demand power is equal to or greater than the set power (S600).

The positive threshold value refers to a positively increased value of the variance of the APS 20 for each set period of time according to the manipulation of the driver. Accordingly, when the driver steps on the accelerator pedal 10 to request acceleration, when an increased amount based on [the variance of the accelerator pedal sensor value]/[set time (ms)] is positive, that is, the positive threshold value, it is determined that the driver is intending on accelerating the vehicle.

The predetermined set power value is set to be less than a power value corresponding to a discharge allowance maximum value of the battery 450 for supplying power to the electric motor 24 or to be less than a maximum output value of the electric motor 24. For example, when the discharge allowance maximum value of the battery 450 for supplying power to the electric motor 24 is 100, the set power value may be 10 to 30. However, it should be understood that the scope of the present invention is not limited thereto.

Operations and actions of the engine start control method and system of the hybrid vehicle according to the exemplary embodiment of the present invention including the aforementioned configuration will be described with reference to FIGS. 3 to 6. In the exemplary embodiment of the present invention, unnecessary starting of the engine and switching the EV mode to the HEV mode when a predetermined time (for example, 2.5 or 3 seconds) passes after the driver starts to step on the accelerator pedal in the related art may be reduced.

More specifically, driver manipulates the accelerator pedal 10 to request acceleration, drive at a fixed speed, or decelerate during the driving (i.e., via releasing the acceleration pedal 10). When the driver manipulates the accelerator pedal 10, an output signal from the accelerator pedal sensor 20 may be output/changed as illustrated in (A) in FIG. 6 or FIG. 2 according to a manipulation state of the accelerator pedal 10.

Figure 6:
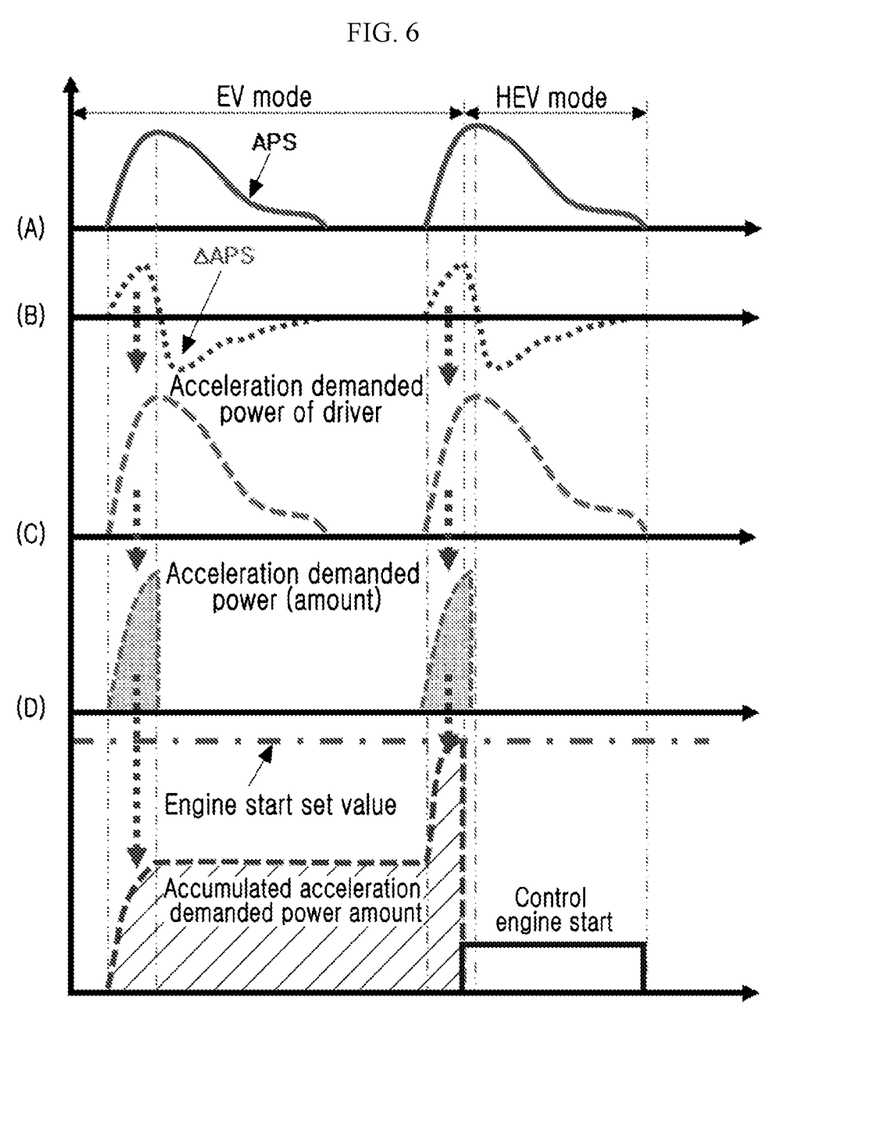
FIG. 6 is an example graph for describing an engine start control method of a hybrid vehicle according to an exemplary embodiment of the present invention.

The output signal of the APS 20 changing according to the manipulation of the accelerator pedal 10 is input to the accelerator pedal sensor signal receiving unit 110 of the HCU 100 (S100). When the output signal of the APS 20 is input in the accelerator pedal sensor signal receiving unit 110, the accelerator pedal sensor signal receiving unit 110 transmits the input output signal of the APS 20 to the variance calculation and determination unit 120.

Once the variance calculation and determination unit 120 receives the output signal of the APS 20 transmitted by the accelerator pedal sensor signal receiving unit 110, the variance calculation and determination unit 120 calculates variance and/or a variance rate of the output signal of the APS for every set time (for example, 50 ms) (S200). In particular, when the variance of the output signal of the APS is a positive value, a depth by which the driver steps on the accelerator pedal is larger than a previous depth, so that it may be determined that the driver has an acceleration intention. When the variance of the output signal of the APS is zero, there is no change in manipulation of the accelerator pedal, so that it may be determined that the driver is requesting the vehicle be driven at a fixed speed. Finally, when the variance of the output signal of the APS is a negative value, a depth by which the driver steps on the accelerator pedal is decreased compared to the previous depth, so it may be determined that the driver would like to decelerate.

The variance calculation and determination unit 120 calculates the variance and/or variance rate of the output signal of the APS for each set period of time to output the variance of the output signal of the APS having a plus (+) threshold value when the driver intends to accelerate as illustrated in (B) in FIG. 6. Further, the variance calculation and determination unit 120 outputs the variance of the output signal of the APS having a value of zero when the driver intends to drive at a fixed speed, and outputs the variance of the output signal of the APS having a negative (−) value when the driver intends on decelerating.

In the exemplary embodiment of the present invention, the hybrid vehicle needs to switch from the EV mode to the HEV mode during the driving when the driver intends on accelerating. Thus, the variance of the output signal of the APS output from the variance calculation and determination unit 120 has the positive value.

Accordingly, when the variance of the output signal of the APS has the positive threshold value as a result of the calculation by the variance calculation and determination unit 120, the variance calculation and determination unit 120 transmits the calculation to the acceleration demanded power calculation and accumulation unit 130 (S300).

When the positive value of the variance of the output signal of the APS is transmitted from the variance calculation and determination unit 120, the acceleration demanded power calculation and accumulation unit 130 calculates acceleration demanded power or acceleration demanded energy demanded by the driver through torque and a speed of the vehicle according to mapping of the APS 20 in a section in which the variance of the output signal of the APS has the positive value, and accumulates the calculated acceleration demanded power or acceleration demanded energy to a previously calculated value (S400).

The acceleration demanded power calculation and accumulation unit 130 may calculate the acceleration demanded power in the section in which the variance of the output signal of the APS has the positive value through an integral of the acceleration demanded power and accumulate the calculated acceleration demanded power. That is, the acceleration demanded power calculation and accumulation unit 130 may calculate a corresponding area of a graph and accumulate the calculated area as illustrated in (D) of FIG. 6.

Those skilled in the art may understand that how to calculate power or energy through the torque and the speed of the vehicle according to the APS mapping and power or energy through an integration calculation via a power calculation method or the energy calculation method which is well known in the art, so the detailed description thereof will be omitted in the present specification.

The acceleration demanded power (amount) calculated and accumulated by the acceleration demanded power calculation and accumulation unit 130 may be input in the engine start control signal output unit 140. When the accumulated acceleration demanded power amount is input in the engine start control signal output unit 140, the engine start control signal output unit 140 determines whether the input accumulated acceleration demanded power amount is equal to or greater than a power value set for switching from the EV mode to the HEV mode (S500). When the accumulated acceleration demanded power amount is equal to or greater than the set power value, the engine start control signal output unit 140 may send a control signal to the ECU 200 to start the engine 26 (S600).

Accordingly, in the exemplary embodiment of the present invention, the driver may switch from the EV mode to the HEV mode at a time at which the driver actually intends on accelerating the vehicle instead of even then the driver is not actually accelerating the vehicle.

Further, in the exemplary embodiment of the present invention, the EV mode is switched to the HEV mode, only when the accumulated acceleration demanded power amount is equal to or greater than the set power value. Accordingly, according to the exemplary embodiment of the present invention, the driver is able to control when to the vehicle switches to the HEV mode, so that it is possible to prevent the optical control of the hybrid vehicle from being disturbed due to random mode switching.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 10: Accelerator pedal | 20: Accelerator pedal sensor (APS) |
| 24: Electric motor | 26: Engine |
| 100: HCU | 110: Accelerator pedal sensor signal receiving unit |
| 120: Variance calculation and determination unit | |
| 130: Acceleration demanded power calculation and accumulation unit | |
| 140: Engine start control signal output unit | |

What is claimed is:

1. A method of controlling start of an engine in a hybrid vehicle running in an electric vehicle (EV) mode using only power from an electric motor or in a hybrid electric vehicle (HEV) mode using power from both the electric motor and power of the engine together, the method comprising:
   calculating, by a controller, variance of an output signal of an accelerator pedal sensor (APS) configured to sense manipulation of an accelerator pedal reflecting an acceleration demand of a driver;
   in response to the calculated variance of the output signal of the accelerator pedal sensor being a positive threshold value:
      calculating, by the controller, acceleration demanded power corresponding to the output signal of the accelerator pedal sensor in a section in which the variance is positive,
      accumulating the calculated acceleration demanded power wherein the calculated variance is a positive threshold value when the variance is positive for each set period of time,
      comparing, by the controller, the accumulated acceleration demanded power with a set power value, and
      starting the engine to switch from the EV mode to the HEV mode when the accumulated acceleration demanded power is equal to or greater than the set power value,
   wherein the set power value is set to be less than a power value corresponding to a discharge allowance maximum value of a battery configured to supply power to the electric motor, and
   the acceleration demanded power is calculated through torque and a speed of the vehicle according to mapping of the accelerator pedal sensor.

2. The method of claim 1, wherein:
   the set power value is set to be less than a maximum output value of the electric motor.

3. The method of claim 1, wherein:
   the accumulated acceleration demanded power is reset after starting the engine.

4. A system for controlling start of an engine in a hybrid vehicle running in an electric vehicle (EV) mode using only power of an electric motor or in a hybrid electric vehicle (HEV) mode using the power of the electric motor and power of the engine together, the system comprising:

an acceleration demand detector configured to detect an acceleration demand of a driver;

an engine starting motor configured to start the engine when the EV mode is switched to the HEV mode; and a control unit configured to start the engine by controlling the engine starting motor based on a signal of the acceleration demand detector, wherein the control unit is one or more controllers each including a processor operating a series of program instructions, and the program instructions a series of commands configured to start an engine of a hybrid vehicle, wherein the control unit is configured to:

calculate a variance of an output signal of an accelerator pedal sensor (APS) configured to sense manipulation of an accelerator pedal reflecting the acceleration demand of the driver, calculate acceleration demanded power corresponding to the output signal of the accelerator pedal sensor when the calculated variance is positive, accumulate the calculated acceleration demanded power, compare the accumulated acceleration demanded power with a set power value, and start the engine to switch from the EV mode to the HEV mode when the accumulated acceleration demanded power is equal to or greater than the set power value, wherein the set power value is set to be less than a power value corresponding to a discharge allowance maximum value of a battery configured to supply power to the electric motor, and the acceleration demanded power is calculated through torque and a speed of the vehicle according to mapping of the accelerator pedal sensor.

5. The system of claim 4, wherein:

the control unit comprises: a battery management system (BMS) configured to manage a battery of the hybrid vehicle; an engine control unit (ECU) configured to control the engine; a motor control unit (MCU) configured to control the electric motor; and a hybrid control unit (HCU) making a control by combining power of the engine and power of the electric motor.

6. The system of claim 5, wherein:

the hybrid control unit comprises:

an accelerator pedal sensor signal receiving unit configured to receive the output signal of the accelerator pedal sensor;

a variance calculation and determination unit configured to calculate variance of a value received from the accelerator pedal sensor signal receiving unit and determine whether a value of the calculated variance is a positive value;

an acceleration demanded power calculation and accumulation unit configured to calculate acceleration demanded power corresponding to the output signal of the accelerator pedal sensor when the value of the variance is the positive value, and accumulate the calculated acceleration demanded power; and an engine start control signal output unit configured to determine whether the accumulated acceleration demanded power is equal to or greater than a set power value, and output a control signal to start the engine when the accumulated acceleration demanded power is equal to or greater than the set power value.

7. The system of claim 6, further comprising:

an acceleration demanded power reset unit configured to reset the accumulated acceleration demanded power when the signal for starting the engine is output.

8. A non-transitory computer readable medium containing program instructions executed by a processor on a controller, the computer readable medium comprising:

program instructions that calculate a variance of an output signal of an accelerator pedal sensor (APS) configured to sense manipulation of an accelerator pedal reflecting the acceleration demand of the driver;

program instructions that calculate acceleration demanded power corresponding to the output signal of the accelerator pedal sensor when the calculated variance is positive and accumulate the calculated acceleration demanded power; and program instructions that compare the accumulated acceleration demanded power with a set power value, and start the engine to switch from the EV mode to the HEV mode when the accumulated acceleration demanded power is equal to or greater than the set power value, wherein the set power value is set to be less than a power value corresponding to a discharge allowance maximum value of a battery configured to supply power to the electric motor, and the acceleration demanded power is calculated through torque and a speed of the vehicle according to mapping of the accelerator pedal sensor.

* * * * *